(12) United States Patent
Takemoto et al.

(10) Patent No.: US 11,630,440 B2
(45) Date of Patent: *Apr. 18, 2023

(54) WIRE DISCONNECTION PREDICTION DEVICE

(71) Applicant: FANUC Corporation, Yamanashi (JP)

(72) Inventors: Masanobu Takemoto, Yamanashi (JP); Keita Hada, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 709 days.

This patent is subject to a terminal disclaimer.

(21) Appl. No.: 16/659,908

(22) Filed: Oct. 22, 2019

(65) Prior Publication Data

US 2020/0150632 A1    May 14, 2020

(30) Foreign Application Priority Data

Nov. 8, 2018    (JP) .............................. JP2018-210344

(51) Int. Cl.
  *G05B 19/4155* (2006.01)
  *G06N 20/00* (2019.01)
  (Continued)

(52) U.S. Cl.
  CPC .......... *G05B 19/4155* (2013.01); *B23H 7/20* (2013.01); *B23H 11/006* (2013.01); *G06N 20/00* (2019.01);
  (Continued)

(58) Field of Classification Search
  CPC .............. B23H 11/006; B23H 2300/00; B23H 2600/00; B23H 7/102; B23H 7/20; G06N 20/00

See application file for complete search history.

(56) References Cited

U.S. PATENT DOCUMENTS

2005/0143849 A1*  6/2005  Hayashi ........... G05B 19/41875
                                                          700/101
2011/0209083 A1   8/2011  Yokegawa et al.
                (Continued)

FOREIGN PATENT DOCUMENTS

CN    103093192 A    5/2013
CN    107680095 A    2/2018
            (Continued)

OTHER PUBLICATIONS

Conde et al., High-accuracy wire electrical discharge machining using artificial neural networks and optimization techniques, Mar. 31, 2017, Robotics and Computer-Integrated Manufacturing, p. 24-38. (Year: 2017).*

(Continued)

*Primary Examiner* — Kidest Bahta
(74) *Attorney, Agent, or Firm* — Hauptman Ham, LLP

(57) ABSTRACT

A wire disconnection prediction device includes: a data acquisition part configured to acquire data relating to machining of a workpiece in a state where a wire is not disconnected during machining of the workpiece by a wire electric discharge machine; a preprocessing part configured to create, machining condition data of a condition relating to a machining condition commanded in machining of the workpiece, machining member data relating to a member used in the machining, and machining state data during machining of the workpiece, as state data indicating a state of the machining; and a learning part configured to generate, based on the state data created by the preprocessing part, a learning model indicating correlation between the state data and the state where the wire of the wire electric discharge machine is not disconnected.

5 Claims, 8 Drawing Sheets

(51) Int. Cl.
*B23H 7/20* (2006.01)
*B23H 11/00* (2006.01)

(52) U.S. Cl.
CPC ...... *B23H 2300/00* (2013.01); *B23H 2600/00* (2013.01); *G05B 2219/45221* (2013.01)

(56) References Cited

U.S. PATENT DOCUMENTS

| | | |
|---|---|---|
| 2013/0024020 A1 | 1/2013 | Onodera et al. |
| 2013/0240486 A1 | 9/2013 | Yamada et al. |
| 2015/0290733 A1 | 10/2015 | Nakagawa |
| 2017/0060105 A1* | 3/2017 | Onodera ............ B23H 7/20 |
| 2017/0087654 A1* | 3/2017 | Abe .................. B23H 7/20 |
| 2018/0117693 A1 | 5/2018 | Hada |
| 2018/0281091 A1 | 10/2018 | Nakashima |

FOREIGN PATENT DOCUMENTS

| | | |
|---|---|---|
| CN | 108090384 A | 5/2018 |
| EP | 3239796 A1 | 11/2017 |
| JP | H5138444 A | 6/1993 |
| JP | 2001-105238 A | 4/2001 |
| JP | 200836812 A | 2/2008 |
| JP | 2010-240761 A | 10/2010 |
| JP | 201286295 A | 5/2012 |
| JP | 201350759 A | 3/2013 |
| JP | 2015125559 A | 7/2015 |
| JP | 2018169934 A | 11/2018 |
| TW | 201817524 A | 5/2018 |
| WO | 8911371 A1 | 11/1989 |
| WO | 2008050405 A1 | 5/2008 |
| WO | 2011/089648 A1 | 7/2011 |
| WO | 2014068679 A1 | 5/2014 |

OTHER PUBLICATIONS

Xia Weiwen et al., "Break-out detection for high-speed small hole drilling EDM based on machine learning", Procedia CIRP, Jan. 1, 2018, pp. 569-574, vol. 68, Elsevier, www.sciencedirect.com, 6pp.

Mathew et al., "Multiple Process Parameter Optimization of WEDM on AISI304 Using Taguchi Grey Relational Analysis", Procedia Materials Science, vol. 5, Jan. 1, 2014, pp. 1613-1622, Elsevier Ltd., 10pp.

* cited by examiner

FIG.6
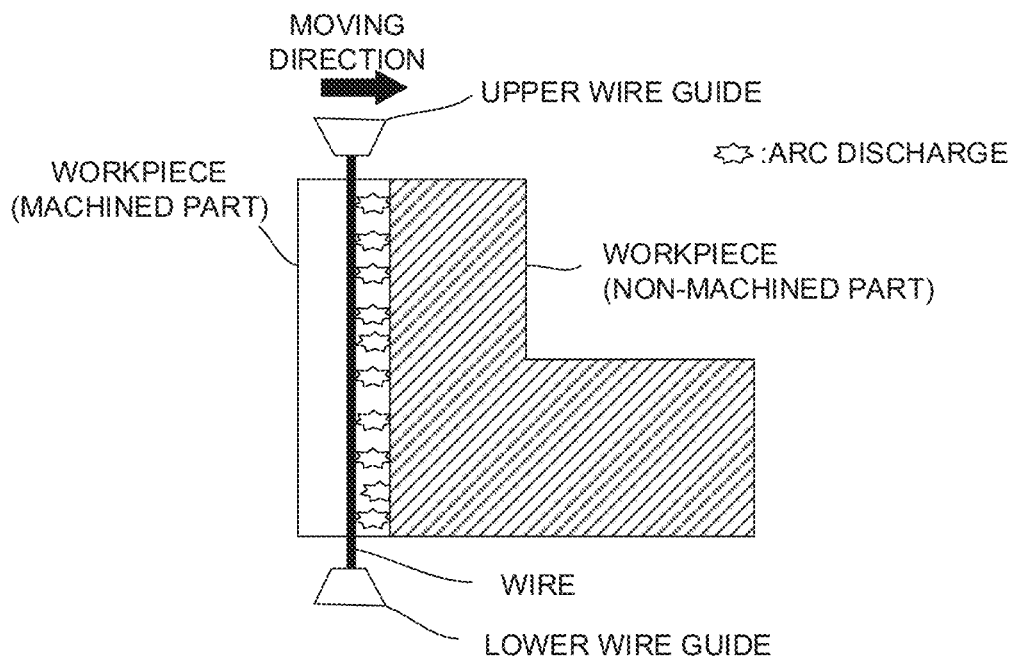
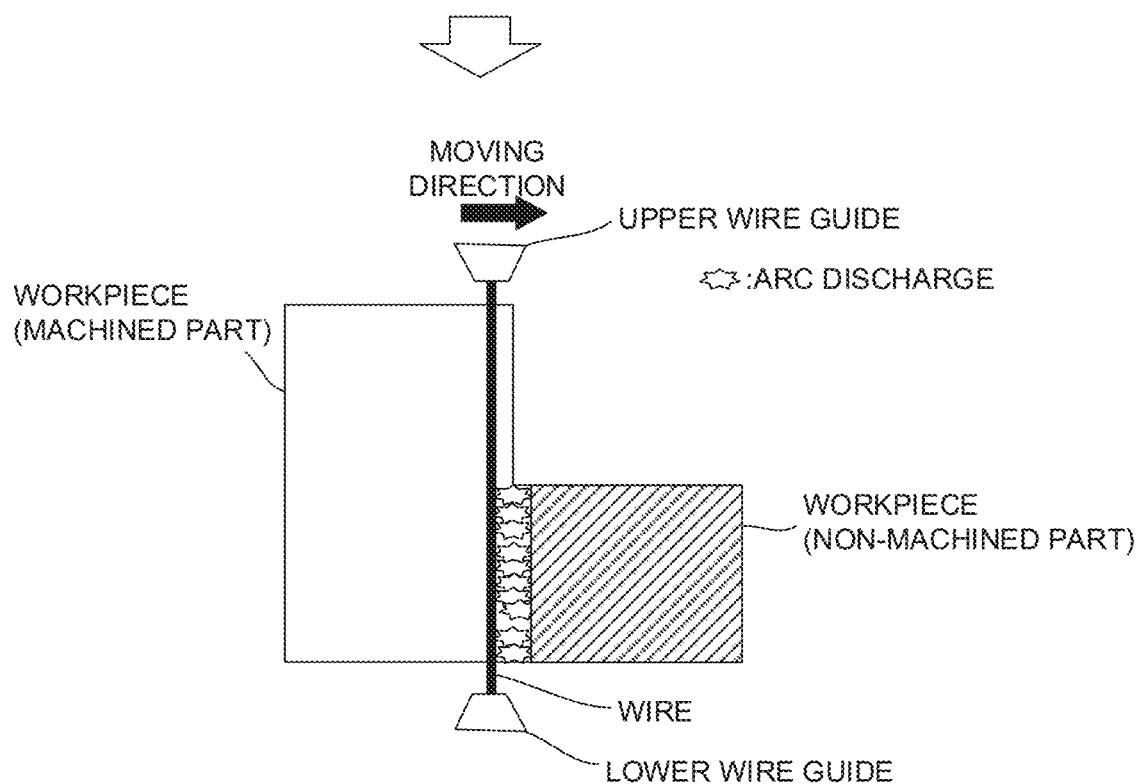

FIG.7
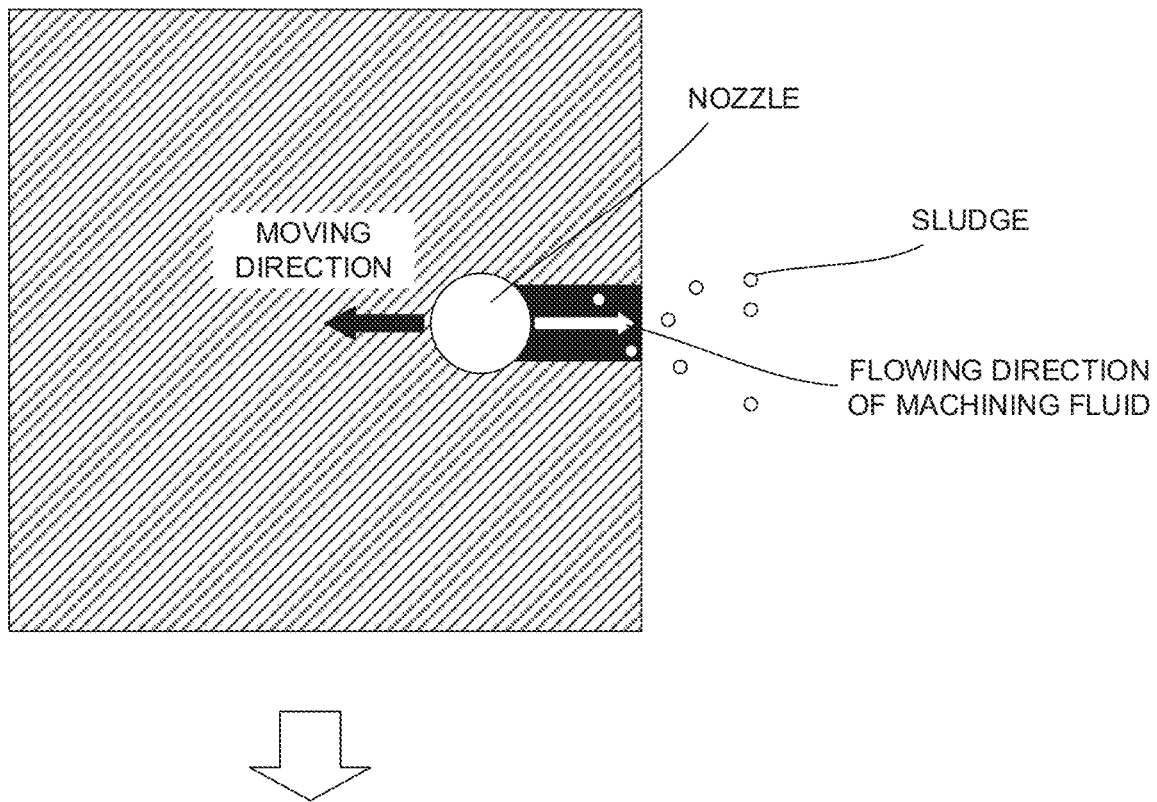
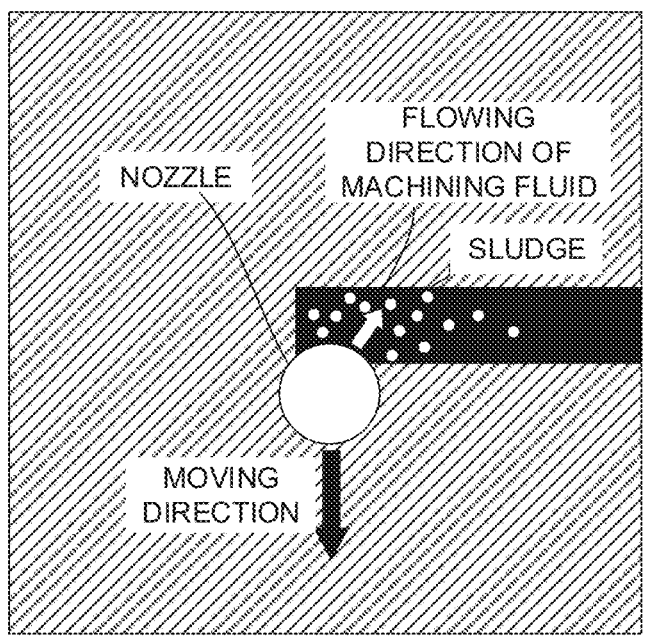

WIRE DISCONNECTION PREDICTION DEVICE

RELATED APPLICATIONS

The present application claims priority to Japanese Patent Application Number 2018-210344 filed Nov. 8, 2018, the disclosure of which is hereby incorporated by reference herein in its entirety.

BACKGROUND OF THE INVENTION

1. Field of the Invention

The present invention relates to a wire disconnection prediction device.

2. Description of the Related Art

In a wire electric discharge machine, a wire electrode used in machining may in some cases be disconnected while a workpiece to be machined is machined. Occurrence of disconnection of the wire depends on a situation of electric discharge machining.

As illustrated in FIG. 6, in the case where the workpiece to be machined has a step portion, the workpiece is machined under a machining condition for a thick plate to machine a thick part of the workpiece (the machining condition that an energy supply amount is large) (an upper diagram in FIG. 6). When machining of a thin part of the workpiece is started under the same machining condition (a lower diagram in FIG. 6), a wire is likely to be disconnected due to the excessively strong machining power.

As illustrated in FIG. 7, machining fluid is supplied between the wire and the workpiece from a nozzle arranged at a guide part of the wire during the electric discharge machining. The machining fluid supplied from the nozzle flows backward with respect to a wire moving direction and sludge (machining waste) is efficiently discharged when a straight line part is machined, however, when a corner part is machined, since the back in the wire moving direction is a dead end, the sludge (machining waste) is not efficiently discharged, normal electric discharge becomes insufficient, and the disconnection tends to occur.

When the wire is to be brought into the workpiece as illustrated in FIG. 8, the machining fluid supplied from the nozzle tends to spread around from a machining part, and there occurs a phenomenon that the sufficient machining fluid is not supplied to the machining part. Thus, when cutting into the workpiece, the wire tends to be disconnected.

In the case where impurities are mixed in the workpiece or the like, the frequency of occurrence of arc discharge varies between a workpiece material part and an impurity part. Therefore, biased electric discharge tends to be generated, and the wire disconnection tends to occur.

Such wire disconnection may cause streaks generated on a machining surface and worsen machining quality. When the wire is disconnected, we need to suspend machining, return a position of upper and lower guides to a machining start point of the workpiece, connect the wire, move they upper and lower guides to a disconnected position, and restart the machining, which decreases machining efficiency.

As a conventional technology for preventing the wire disconnection, Japanese Patent Laid-Open No. 2010-240761 discloses changing a machining condition at a step part where a plate thickness of the workpiece changes. Japanese Patent Laid-Open No. 2001-105238 discloses avoiding the disconnection by turning on a switch for current bypassing when abnormality is detected in a voltage applied between a wire electrode and the workpiece. International Publication No. WO2011/089648 discloses acquiring a disconnection threshold and an appropriate machining condition for each plate thickness in a trial machining process so as to set the appropriate machining condition according to the plate thickness during the machining.

However, the wire disconnection in the wire electric discharge machine occurs in various situations. Even when a method of changing the machining condition indicated in Japanese Patent Laid-Open No. 2010-240761 is to be adopted, experiments need to be carried out beforehand for the various situations where the disconnection tends to occur. It is difficult to cope with the disconnection occurring in combinations of the plurality of situations. Further, in the technology indicated in Japanese Patent Laid-Open No. 2001-105238, the threshold for determining an abnormal voltage varies depending on the situation of the machining. Therefore, evenly applied bypassing without considering the situation at the time when a predetermined voltage is detected does not always achieve efficient machining. In the technology indicated in International Publication No. WO2011/089648, the trial machining process needs to be performed for the plurality of plate thicknesses beforehand for each of various kinds of workpieces. Thus, there is a problem that it takes time and labor to cope with all kinds of situations.

SUMMARY OF THE INVENTION

An object of the present invention is to provide a wire disconnection prediction device capable of predicting wire disconnection according to various machining situations in machining by a wire electric discharge machine.

The present invention solves the above-described problems by predicting a wire disconnection risk using machining data relating to the machining situation acquired during the machining by the wire electric discharge machine and a machine learning model. As the learning model used by the wire disconnection prediction device of the present invention, it is assumed to use the learning model capable of calculating a correlation value of a machining condition and the wire disconnection risk, and as an example, the present description shows the example utilizing an MT (Mahalanobis Taguchi) method often used as an abnormality detection method using machine learning. In learning for wire disconnection prediction using the MT method, the wire disconnection prediction device creates the learning model by performing learning using the machining data acquired during the machining without the wire disconnection. Then, when predicting the wire disconnection by the wire disconnection prediction device, the wire disconnection prediction device inputs the machining data acquired during the machining to the learning model, calculates a distance (Mahalanobis distance) between the acquired machining data and the machining data when the wire is not disconnected, and estimates the wire disconnection risk from the calculation result. Then, the wire disconnection prediction device optimizes the machining condition by the wire electric discharge machine based on the estimated wire disconnection risk.

One aspect of the present invention is a wire disconnection prediction device for estimating a wire disconnection risk during machining of a workpiece in a wire electric discharge machine, and the wire disconnection prediction device includes: a data acquisition part configured to acquire data relating to machining of the workpiece in a state where a wire is not disconnected during machining of the workpiece by the wire electric discharge machine; a preprocessing part configured to create, based on the data acquired by the data acquisition part, machining condition data of a condition relating to a machining condition commanded in machining of the workpiece, machining member data relating to a member used in the machining, and machining state data during machining of the workpiece, as state data indicating a state of the machining; and a learning part configured to generate, based on the state data created by the preprocessing part, a learning model indicating correlation between the state data and the state where the wire of the wire electric discharge machine is not disconnected.

The other aspect of the present invention is a wire disconnection prediction device for estimating a wire disconnection risk during machining of a workpiece in a wire electric discharge machine, and the wire disconnection prediction device includes: a data acquisition part configured co acquire data relating to machining of the workpiece during machining of the workpiece by the wire electric discharge machine; a preprocessing part configured to create, based on the data acquired by the data acquisition part, machining condition data of a condition relating to a machining condition commanded in machining of the workpiece, machining member data relating to a member used in the machining, and machining state data during machining of the workpiece, as state data indicating a state of the machining; a learning model storage part configured to store a learning model obtained by learning correlation between the state data indicating the state of the machining and the state where the wire of the wire electric discharge machine is not disconnected; and an estimation part configured to estimate the wire disconnection risk of the wire electric discharge machine using the learning model stored in the learning model storage part, based on the state data created by the preprocessing part.

According to the present invention, the wire disconnection can be predicted corresponding to various machining situations in the machining by the wire electric discharge machine, and the machining condition of the wire electric discharge machine can be automatically adjusted based on the predicted wire disconnection risk.

BRIEF DESCRIPTION OF THE DRAWINGS

Objects and features described above and she like of the present invention will be clarified from description of embodiments below with reference to attached drawings. Among the drawings:

FIG. 6 is a diagram illustrating an example of the wire disconnection risk in a wire electric discharge machine;

FIG. 7 is a diagram illustrating another example of the wire disconnection risk in the wire electric discharge machine.

DETAILED DESCRIPTION OF THE PREFERRED EMBODIMENTS

Hereinafter, the embodiments of the present invention will be described together with the drawings.

Figure 1:
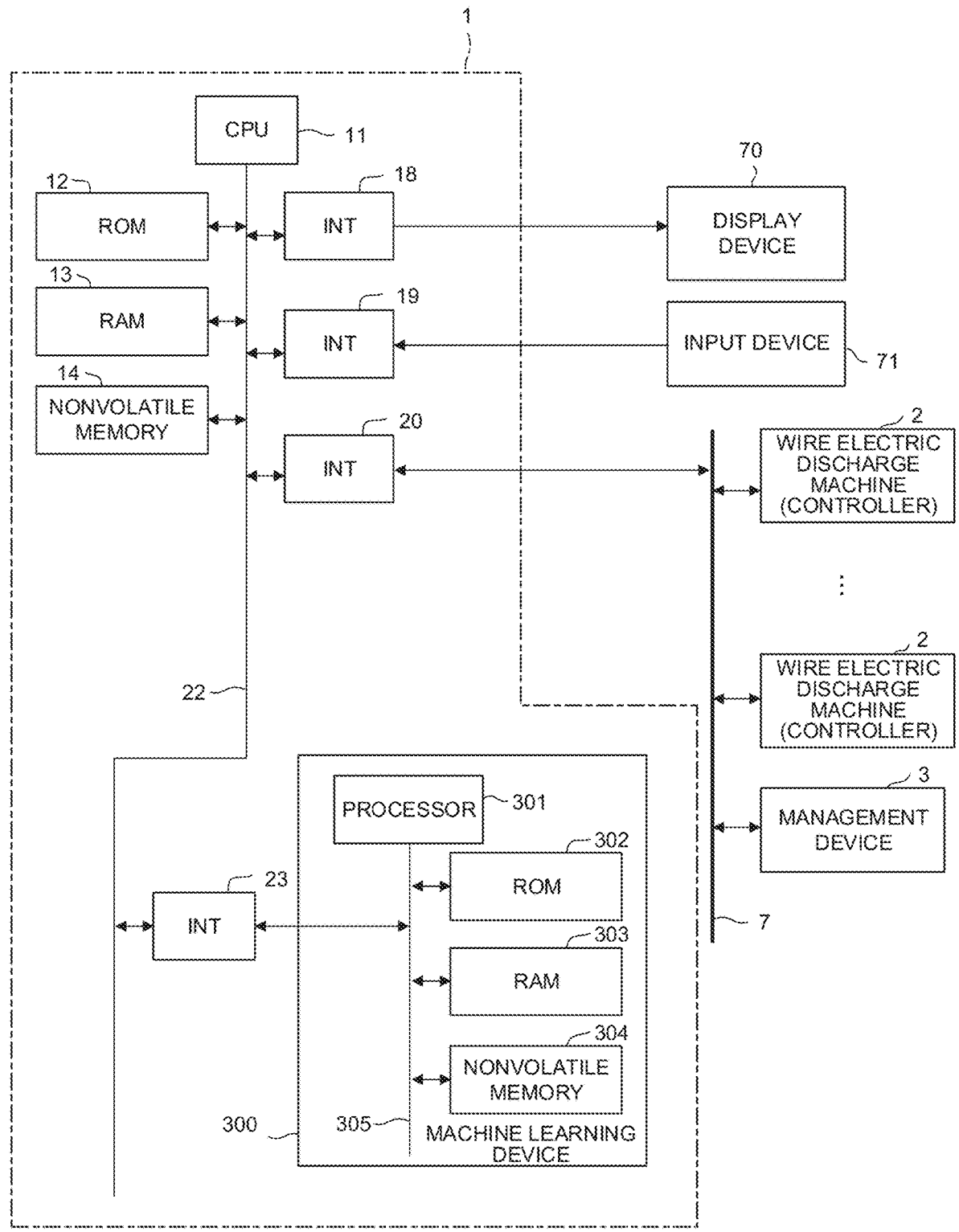
FIG. 1 is a schematic hardware configuration diagram of a wire disconnection prediction device according to an embodiment of the present invention.

FIG. 1 is a schematic hardware configuration diagram illustrating a main part of a wire disconnection prediction device according to one embodiment of the present invention. A wire disconnection prediction device 1 of the present embodiment can be mounted as a controller that controls a wire electric discharge machine. The wire disconnection prediction device 1 can be mounted as a personal computer provided together with the controller that controls the wire electric discharge machine, a management device 3 connected with the controller that controls the wire electric discharge machine through a network, or a computer such as an edge computer, a cell computer, a host computer or a cloud server. The present embodiment illustrates an example of a case of mounting the wire disconnection prediction device 1 as a computer connected with the controller that controls the wire electric discharge machine through a cable/wireless network 7.

A CPU 11 provided in the wire disconnection prediction device 1 according to the present embodiment is a processor that generally controls the wire disconnection prediction device 1. The CPU 11 reads a system program stored in a ROM 12 connected through a bus 22, and controls the entire wire disconnection prediction device 1 according to the system program. A RAM 13 stores calculation data temporarily, display data for a display device 70, various kinds of data inputted by an operator through an input device 71 and the like.

A nonvolatile memory 14 is configured by a memory and an SSD (Solid State Drive) or the like backed up by a battery not shown in the figure for example, and is configured as the memory in which a storage state is held even when a power source of the wire disconnection prediction device 1 is turned off. The nonvolatile memory 14 stores a setting area where setting information relating to an operation of the wire disconnection prediction device 1 is stored, the data inputted from the input device 71, various kinds of data (a workpiece material, a workpiece shape, a wire material, a wire diameter or the like) acquired from each wire electric discharge machine 2, various kinds of physical quantities (a machining route, a machining voltage, a current, a speed, a machining fluid amount, a machining fluid pressure, the number of times of normal electric discharge, the number of times of abnormal electric discharge or the like) detected in the operation of each wire electric discharge machine 2, data read through a non-illustrated external storage device or a network, and the like. Programs and the various kinds of data stored in the nonvolatile memory 14 may be developed in the RAM 13 when executed/when utilized. In the ROM 12, the system program including a known analysis program or the like for analyzing the various kinds of data is written beforehand.

The wire disconnection prediction device 1 is connected with the cable/wireless network 7 through an interface 20. To the network 7, at least one wire electric discharge machine 2 and the management device 3 that manages machining work by the wire electric discharge machine 2 or the like are connected, and the wire electric discharge machine 2 and the management device 3 mutually exchange the data with the wire disconnection prediction device 1.

The wire electric discharge machine 2 machines workpiece by applying a voltage to a wire electrode and the workpiece in machining fluid, causing arc discharge, melting the workpiece with heat of the electric discharge, and blowing away the melted workpiece by a vaporization explosion of the rapidly heated machining fluid. The wire electric discharge machine 2 is configured by various materials such as upper and lower guides, upper and lower nozzles, a wire, a motor and a machining power source, states of individual parts are detected by a sensor or the like, and operations of the individual parts are controlled by the controller.

To the display device 70, the individual pieces of data read on the memory, and data obtained as a result of executing the program or the like are outputted through an interface 18 and displayed. In addition, the input device 71 configured by a keyboard, a pointing device or the like delivers commands and data or the like based on operations by an operator to the CPU 11 through an interface 19.

An interface 23 connects a machine learning device 300 to the wire disconnection prediction device 1. The machine learning device 300 includes a processor 301 that controls the entire machine learning device 300, a ROM 302 that stores the system program or the like, a RAM 303 for performing temporary storage in individual processing relating to machine learning, and a nonvolatile memory 304 used for storing a learning model or the like. The machine learning device 300 observes individual information (for example, the workpiece material, the workpiece shape, the wire material, the wire diameter, the machining route, the machining voltage, the current, the speed, the machining fluid amount, the machining fluid pressure, the number of times of the normal electric discharge, the number of times of the abnormal electric discharge or the like) acquirable in the wire disconnection prediction device 1 through the interface 23. The wire disconnection prediction device 1 acquires a processing result outputted from the machine learning device 300 through the interface 23, and stores the acquired result, displays the result or transmits the result through a non-illustrated network or the like to other devices.

Figure 2:
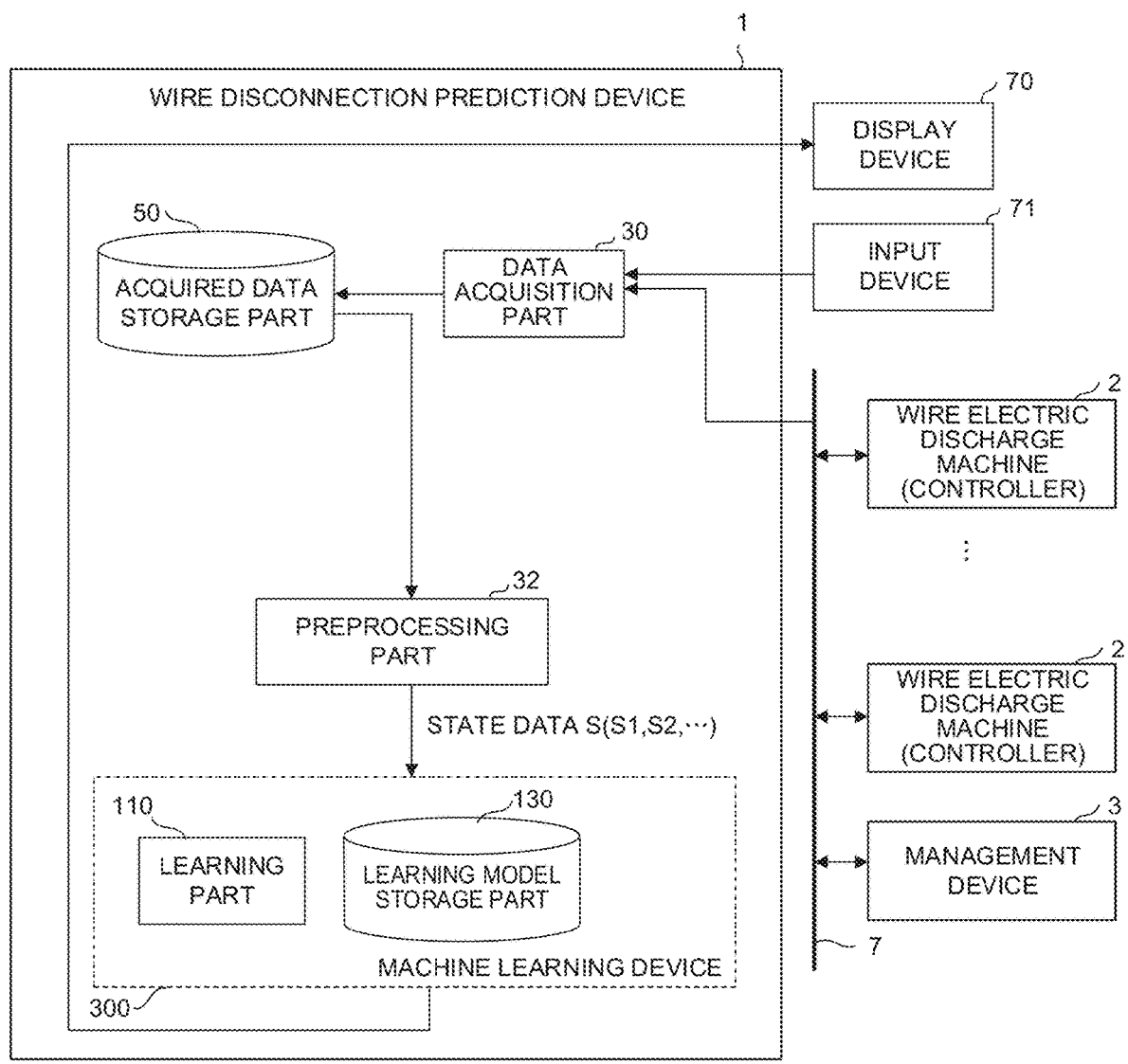
FIG. 2 is a schematic functional block diagram of the wire disconnection prediction device according to a first embodiment.

FIG. 2 is a schematic functional block diagram of the wire disconnection prediction device 1 and the machine learning device 300 according to one embodiment. The wire disconnection prediction device 1 illustrated in FIG. 2 includes a configuration required in the case where the machine learning device 300 performs learning (learning mode). Individual functional blocks (a data acquisition part 30, a preprocessing part 32, a learning part 110 or the like) illustrated in FIG. 2 are achieved by the CPU 11 provided in the wire disconnection prediction device 1 and the processor 301 of the machine learning device 300 illustrated in FIG. 1 executing the respective system programs and controlling the operations of the individual parts of the wire disconnection prediction device 1 and the machine learning device 300.

The wire disconnection prediction device 1 of the present embodiment includes the data acquisition part 30, and the preprocessing part 32. The machine learning device 300 provided in the wire disconnection prediction device 1 includes the learning part 110. The nonvolatile memory 14 (FIG. 1) includes an acquired data storage part 50 that stores the data acquired from the wire electric discharge machine 2 by the data acquisition part 30. The nonvolatile memory 304 (FIG. 1) of the machine learning device 300 includes a learning model storage part 130 that stores a learning model constructed by machine learning by the learning part 110.

The data acquisition part 30 acquires various kinds of data from the wire electric discharge machine 2. The data acquisition part 30 acquires the individual pieces of data such as the workpiece material, the workpiece shape, the wire material, the wire diameter, the machining route, the machining voltage, the machining current, the machining speed, the machining fluid amount, the machining fluid pressure, the number of times of the normal electric discharge, the number of times of the abnormal electric discharge during the machining of the wire electric discharge machine 2 for example, and stores the data in the acquired data storage part 50. The data acquisition part 30 acquires two or more pieces of data relating to the wire electric discharge machine 2 when the machining is normally performed (that is, when the wire is not disconnected) in the wire electric discharge machine 2. The data acquisition part 30 can acquire the data as a condition relating to the machining set to the controller of the wire electric discharge machine 2, command values commanded to the individual parts by the controller of the wire electric discharge machine 2, measurement values measured from the individual parts by the controller of the wire electric discharge machine 2, and a detection value by a separately installed sensor or the like. The data acquisition part 30 may acquire the data from the other devices through the non-illustrated external storage device or the cable/wireless network.

The preprocessing part 32 creates learning data used in learning by the machine learning device 300 based on the data acquired by the data acquisition part 30. The preprocessing part 32 creates she learning data for which the individual pieces of data are converted (digitized, sampled or the like) to a unified form handled in the machine learning device 300. The preprocessing part 32 creates state data S of a predetermined form for so-called unsupervised learning performed by the machine learning device 300 as the learning data. The state data S created by the preprocessing part 32 includes machining condition data S1 including the command values of a machining voltage, a machining current, a machining speed, the machining fluid amount and the machining fluid pressure relating to the machining of the workpiece of the wire electric discharge machine 2, machining member data S2 including the material of the wire used in the machining in the wire electric discharge machine 2, the wire diameter, the material of the workpiece to be machined or the like, and machining state data S3 including the voltage, the current, the number of times of the normal electric discharge, the number of times of the abnormal electric discharge or the like measured in the machining of the workpiece of the wire electric discharge machine 2.

For the machining condition data S1, the command values commanded to the individual parts by the controller of the wire electric discharge machine 2, which are acquired by the data acquisition part 30, or the like can be used. For the machining condition data S1, commands by a machining program and the various kinds of command values installed in the wire electric discharge machine 2 may be used.

For the machining member data S2, information of the wire and the workpiece set in the controller of the wire electric discharge machine 2, which are acquired by the data acquisition part 30, can be used.

For the machining state data S3, the measurement values measured from the individual parts by the controller of the wire electric discharge machine 2 and the detection value by the separately installed sensor or the like, which are acquired by the data acquisition part 30, can be used. For the machining state data S3, for example, parameters (known parameters in wire electric discharge machining such as electric discharge pulse time, suspension pulse time, a peak value and a pulse width) indicating time-sequential data of a voltage value and a voltage waveform measured during the machining, parameters (known parameters in the wire electric discharge machining such as the electric discharge pulse time, the suspension pulse time, the peak value and the pulse width) indicating time-sequential data of a current value and a current waveform, and the numbers of times of the normal electric discharge (for example, an interpolar voltage value exceeds a determination level and then becomes lower than the determination level after a lapse of determination time) and the abnormal electric discharge (for example, the interpolar voltage value exceeds the determination level and then becomes lower than the determination level before the lapse of the determination time, or does not exceed the determination level or the like) within a predetermined time period may be used.

The learning part 110 performs the unsupervised learning using the learning data created by the preprocessing part 32, and generates (learns) the learning model obtained by learning the correlation between a situation where the wire is not disconnected in the wire electric discharge machine 2 and the state data S at the time. The learning part 110 of the present embodiment learns the correlation between the situation where the wire is not disconnected in the wire electric discharge machine 2 and the state data S at the time by an MT (Mahalanobis Taguchi) method for example. The MT method is an information processing technology for introducing one measure for a set of the data configured by multi-dimensional information and recognizing the tendency.

In the present embodiment, the learning part 110 defines the learning data (the machining condition data S1, the machining member data S2 and the machining state data S3) created by the preprocessing part 32 as a normal data group to be a reference, and defines a set of the normal data group when considering a vector x for which data items of the individual pieces of learning data are elements as a unit space. Next, the learning part 110 obtains a center position (average vector) of the unit space based on the individual pieces of data configuring the normal data group, and estimates a correlation coefficient matrix of the unit space based on the individual pieces of data configuring the normal data group. Then, the learning part 110 calculates a Mahalanobis distance from the center position for the individual pieces of data configuring the normal data group, determines a threshold based on the calculation result, and stores the individual calculated values in the learning model storage part 130 as the learning model. Note that, since details of the MT method are already made known by many documents, detailed explanations in the present description are omitted.

Figure 3:
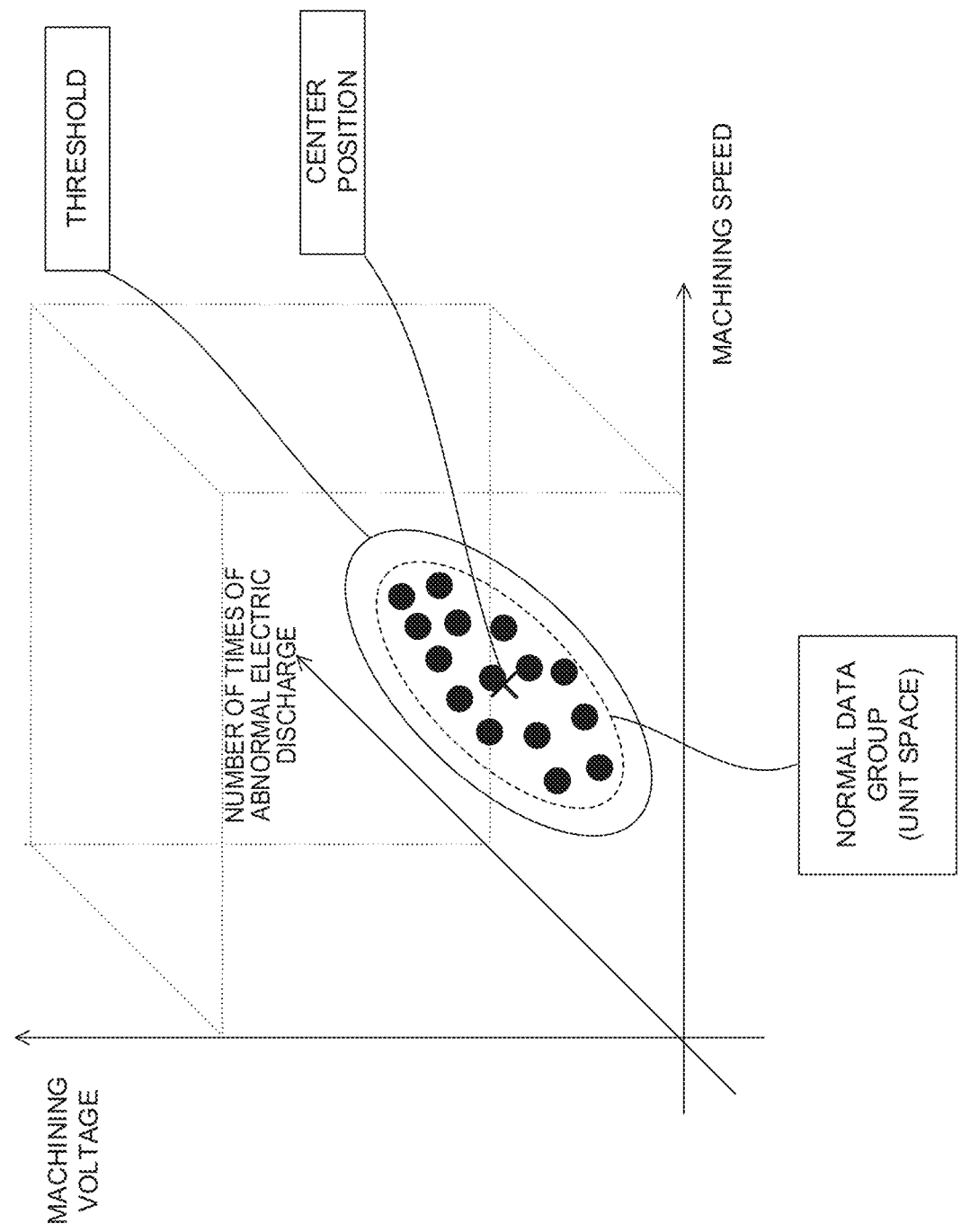
FIG. 3 is a diagram illustrating an image of a learning model generated by a learning part.

FIG. 3 is a diagram illustrating an image of the learning model created by the learning part 110. In FIG. 3, to recognize the image of the learning model easily, the image is illustrated assuming that the learning data is configured by the three parameters of the machining voltage, the machining speed and the number of times of the abnormal electric discharge. Then, when the data (state data) during the machining is newly acquired from the wire electric discharge machine 2, in the case where the Mahalanobis distance from the center position of the unit space in a vector space of the learning data exceeds the determined threshold, it is determined that a machining state is abnormal (there is a risk of wire disconnection).

Figure 4:
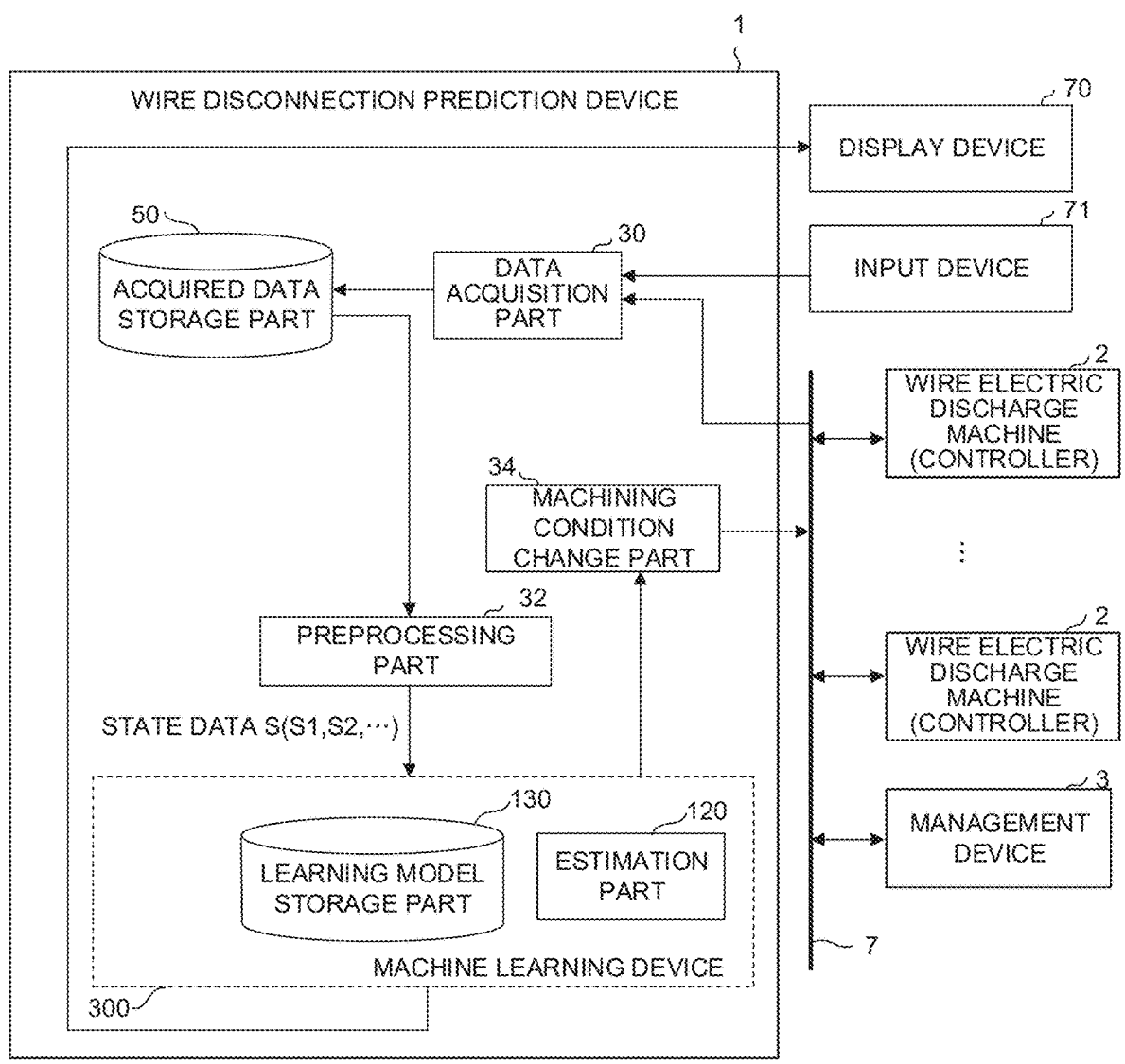
FIG. 4 is a schematic functional block diagram of the wire disconnection prediction device according to a second embodiment.

FIG. 4 is a schematic functional block diagram of the wire disconnection prediction device 1 and the machine learning device 300 according to another embodiment. The wire disconnection prediction device 1 of the present embodiment includes a configuration required in the case where the machine learning device 300 performs estimation (estimation mode). The individual functional blocks illustrated in FIG. 4 are achieved by the CPU 11 provided in the wire disconnection prediction device 1 and the processor 301 of the machine learning device 300 illustrated in FIG. 1 executing the respective system programs and controlling the operations of the individual parts of the wire disconnection prediction device 1 and the machine learning device 300.

The wire disconnection prediction device 1 of the present embodiment includes the data acquisition part 30 and the preprocessing part 32 similarly to the previous embodiment, and further includes a machining condition change part 34. The machine learning device 300 provided in the wire disconnection prediction device 1 includes an estimation part 120. Further, the nonvolatile memory 14 (FIG. 1) includes the acquired data storage part 50 that stores the data acquired from the wire electric discharge machine 2 by the data acquisition part 30, and the nonvolatile memory 304 (FIG. 1) of the machine learning device 300 includes the learning model storage part 130 that stores the learning model constructed by the machine learning by the learning part 110 (FIG. 2).

The data acquisition part 30 and the preprocessing part 32 according to the present embodiment have same functions as the functions of the data acquisition part 30 and the preprocessing part 32 of the previous embodiment.

The estimation part 120 estimates a wire disconnection risk of the wire electric discharge machine 2 using the learning model stored in the learning model storage part 130, based on the state data S created by the preprocessing part 32. In the estimation part 120 of the present embodiment, under the learning model (the correlation between the situation where the wire is not disconnected in the wire electric discharge machine 2 and the state data S at the time) created by the learning part 110 (FIG. 2), a distance (the distance in consideration of the correlation) indicating how far the state data S inputted from the preprocessing part 32 is separated from a data group acquired when the machining can be performed without the wire disconnection is obtained. Then, the wire disconnection risk of the wire electric discharge machine 2 is estimated based on the result. The estimation part 120 of the present embodiment estimates the wire disconnection risk of the wire electric discharge machine 2 by the MT method.

In the present embodiment, for the state data S (the machining condition data S1, the machining member data S2 and the machining state data S3) to be an estimation object created by the preprocessing part 32, when considering the vector x for which the data items of the state data S are the elements, in the case where the Mahalanobis distance between the vector x and the center position of the unit space in the vector space of the learning data exceeds the determined threshold, the estimation part 120 estimates that the machining state is abnormal (there is the risk of the wire disconnection). The estimation part 120 may estimate that a degree of the wire disconnection risk becomes high according to the degree of how far the Mahalanobis distance between the center position of the unit space and the vector x is separated from the threshold. At the time, a value for which a predetermined coefficient is multiplied with the Mahalanobis distance between the center position of the unit space and the vector x may be defined as a wire disconnection risk value.

Figure 5:
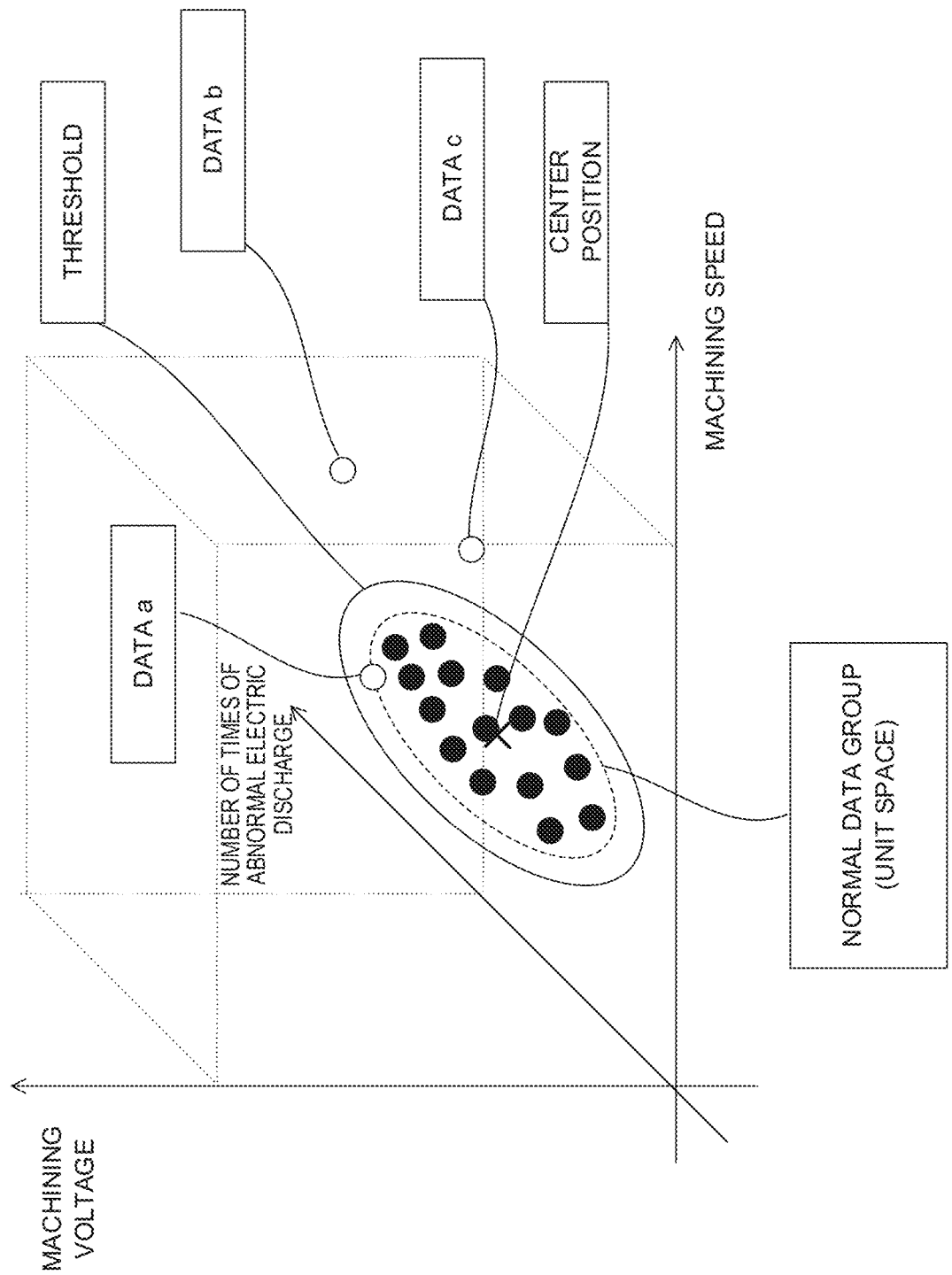
FIG. 5 is a diagram illustrating an image of estimation of a wire disconnection risk by an estimation part.
Figure 8:
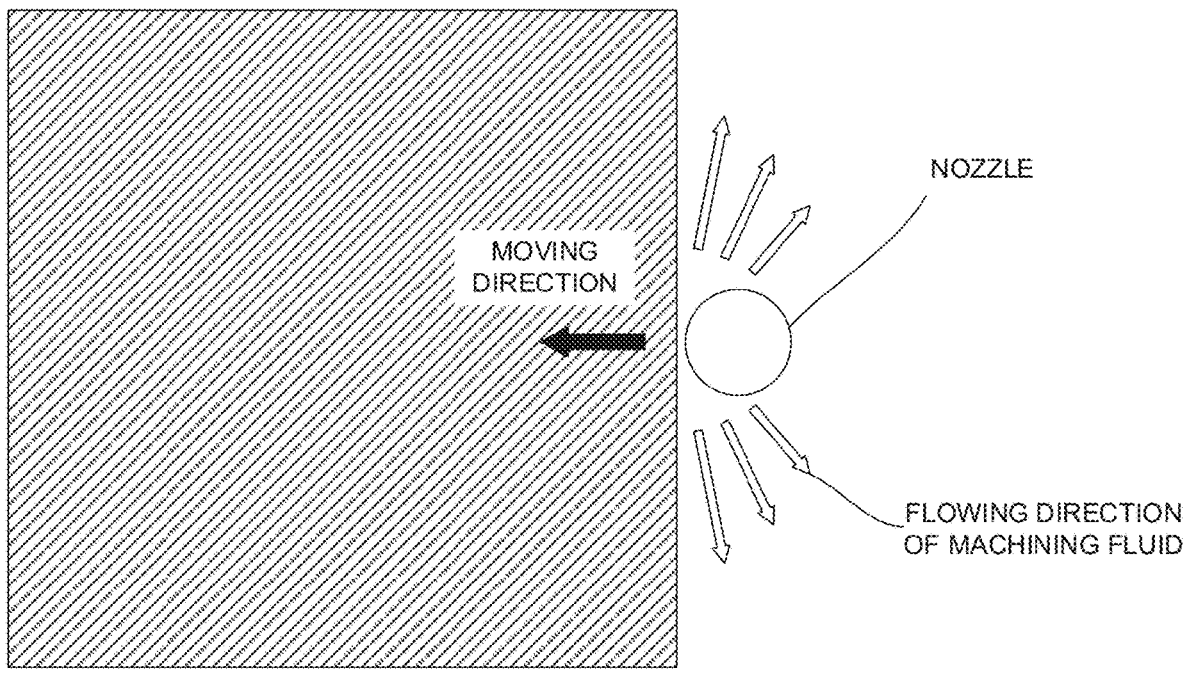
FIG. 8 is a diagram illustrating another example of the wire disconnection risk in the wire electric discharge machine.

FIG. 5 is a diagram illustrating an image of estimation processing by the estimation part 120. FIG. 5 illustrates the case where the preprocessing part 32 creates pieces of data (a), (b) and (c) based on the data acquired by the data acquisition part. In the example of FIG. 5, since the data (a) acquired in a predetermined machining state is within a range of the threshold in a view from the center position of the unit space, it is estimated that the risk of the wire disconnection is low in the machining state. Since both of the data (b) and the data (c) acquired in the predetermined machining state are out of the range of the threshold in the view from the center position of the unit space, it is estimated that the risk of the wire disconnection is high in the machining state. Since the Mahalanobis distance from the center position of the unit space is long for the data (b) compared to the data (c), it is estimated that the wire disconnection risk is higher in the machining state indicated by the data (b) than in the machining state indicated by the data (c).

The result (wire disconnection risk) of the estimation by the estimation part 120 may be displayed and outputted at the display device 70 or transmitted and outputted to a host computer or a cloud computer or the like through the non-illustrated cable/wireless network and utilized. In addition, the machining condition change part 34 may change the machining condition of the wire electric discharge machine 2, based on the result of the estimation by the estimation part 120.

In the case where the result (wire disconnection risk) of the estimation by the estimation part 120 is "the risk of the wire disconnection is high", the machining condition change part 34 adjusts the machining condition of the wire electric discharge machine 2 such that the wire is hardly disconnected (for example, electric discharge suspension time is prolonged so that power supplied to a machining part lowers, or an amount of the machining fluid supplied to a machining position is increased or the like). In addition, in the case where the result (wire disconnection risk) of the estimation by the estimation part 120 is "the risk of the wire disconnection is low", the machining condition change part 34 adjusts the machining condition of the wire electric discharge machine 2 so as to increase the machining speed (for example, the electric discharge suspension time is shortened so that the power supplied to the machining part rises or the like). In the case where the estimation part 120 estimates the degree of the wire disconnection risk, the machining condition change part 34 may change a change amount of the machining condition according to the estimated degree of the wire disconnection risk.

In the wire disconnection prediction device 1 including the configuration described above, the estimation part 120 estimates the wire disconnection risk of the wire electric discharge machine 2 based on the data acquired from the wire electric discharge machine 2, and the machining condition of the wire electric discharge machine 2 is adjusted based on the estimation result. Therefore, the machining can be performed under the appropriate machining condition without the wire disconnection according to the machining state. Thus, since it is not needed to lower the machining condition in the same way even during an unmanned operation, the efficient wire electric discharge machining (the wire electric discharge machining for which the machining speed is maintained at a high speed in the range that the wire is not disconnected) can be performed.

While the one embodiment of the present invention is described above, the present invention is not limited only to the embodiments described above, and can be implemented in various aspects by adding appropriate changes.

For example, while the wire disconnection prediction device 1 and the machine learning device 300 are described as the devices including the different CPUs (processors) in the above-described embodiments, the machine learning device 300 may be achieved by the CPU 11 provided in the wire disconnection prediction device 1 and the system program stored in the ROM 12.

The above-described embodiments illustrate the example of mounting the wire disconnection prediction device 1 on the computer connected with the controller of the wire electric discharge machine 2 through the network 7. For example, mounting may be performed by appropriately changing arrangement of individual components such as mounting only a part of the machine learning device 300 on a host computer and mounting a main body of the wire disconnection prediction device 1 including the data acquisition part 30, the preprocessing part 32 and the machining condition change part 34 on an edge computer or the like.

The invention claimed is:

1. A wire disconnection prediction device for estimating a wire disconnection risk during machining of a workpiece in a wire electric discharge machine, the wire disconnection prediction device comprising:
  a data acquisition part configured to acquire data relating to machining of the workpiece in a state where a wire is not disconnected during machining of the workpiece by the wire electric discharge machine;
  a preprocessing part configured to create, based on the data acquired by the data acquisition part, a plurality of data comprising machining condition data of a condition relating to a machining condition commanded in machining of the workpiece, machining member data relating to a member used in the machining, and machining state data during machining of the workpiece, as state data indicating a state of the machining; and
  a learning part configured to generate, based on the state data created by the preprocessing part, a learning model indicating correlation between the state data and the state where the wire of the wire electric discharge machine is not disconnected,
  wherein the preprocessing part converts the plurality of data into a unified form so as to be processable by the learning part; and
  the learning part uses an MT (Mahalanobis Taghchi) method to generate the learning model indicating the correlation between the state data and the state where the wire of the wire electric discharge machine is not disconnected.

2. A wire disconnection prediction device for estimating a wire disconnection risk during machining of a workpiece in a wire electric discharge machine, the wire disconnection prediction device comprising:
  a data acquisition part configured to acquire data relating to machining of the workpiece during machining of the workpiece by the wire electric discharge machine;
  a preprocessing part configured to create, based on the data acquired by the data acquisition part, a plurality of data comprising machining condition data of a condition relating to a machining condition commanded in machining of the workpiece, machining member data relating to a member used in the machining, and machining state data during machining of the workpiece, as state data indicating a state of the machining;

a learning model storage part configured to store a learning model obtained by learning correlation between the state data indicating the state of the machining and the state where the wire of the wire electric discharge machine is not disconnected; and an estimation part configured to estimate the wire disconnection risk of the wire electric discharge machine using the learning model stored in the learning model storage part, based on the state data created by the preprocessing parts, wherein the preprocessing part converts the plurality of data into a unified form so as to be processable by the learning part; and the learning model storage part stores the learning model obtained by using an MT (Mahalanobis Taghchi) method to learn the correlation between the state data and the state where the wire of the wire electric discharge machine is not disconnected.

3. The wire disconnection prediction device according to claim 2, wherein the estimation part calculates a Mahalanobis distance between the state data created by the preprocessing part and a center position of a unit space in the learning model, and estimates the wire disconnection risk of the wire electric discharge machine based on the calculated Mahalanobis distance.

4. The wire disconnection prediction device according to claim 2 further comprising a machining condition change part configured to change the machining condition of the wire electric discharge machine based on the wire disconnection risk of the wire electric discharge machine estimated by the estimation part.

5. The wire disconnection prediction device according to claim 4, wherein the estimation part estimates magnitude of the wire disconnection risk of the wire electric discharge machine according to magnitude of the calculated Mahalanobis distance, and the machining condition change part adjusts strength of the machining condition to be changed based on the magnitude of the wire disconnection risk of the wire electric discharge machine estimated by the estimation part.

* * * * *